United States Patent [19]

Ogasa et al.

[11] 4,303,678

[45] Dec. 1, 1981

[54] METHOD OF MANUFACTURING A PACKAGED SOYBEAN CURD

[75] Inventors: Katsuhiro Ogasa, Yokohama; Morio Kuboyama, Tokyo; Kunisuke Kuwahara, Yokohama; Ryo Kato, Yokosuka; Hiroshi Shimada, Tokyo, all of Japan

[73] Assignee: Morinaga Milk Industry Co., Ltd., Tokyo, Japan

[21] Appl. No.: 174,439

[22] Filed: Aug. 1, 1980

[30] Foreign Application Priority Data

Aug. 8, 1979 [JP] Japan .................................. 54-100883

[51] Int. Cl.³ ............................ A23L 1/20; A23J 3/00
[52] U.S. Cl. .................................. 426/46; 426/656; 435/68; 435/170
[58] Field of Search ...................... 426/46, 52; 435/68, 435/170

[56] References Cited

U.S. PATENT DOCUMENTS

| | | | |
|---|---|---|---|
| 3,096,177 | 7/1963 | Ariyama | 426/43 |
| 3,743,516 | 7/1973 | Lundstedt et al. | 426/46 X |
| 3,937,843 | 2/1976 | Osaka et al. | 426/46 |
| 3,944,676 | 3/1976 | Fridman et al. | 426/46 |
| 3,950,544 | 4/1976 | Fridman | 426/46 |
| 4,110,477 | 8/1978 | Naruse et al. | 426/52 X |

FOREIGN PATENT DOCUMENTS 2347219  3/1975  Fed. Rep. of Germany ........ 426/46

*Primary Examiner*—Robert A. Yoncoskie
*Attorney, Agent, or Firm*—Oblon, Fisher, Spivak, McClelland & Maier

[57] ABSTRACT

A method of manufacturing a packaged soybean curd with a long shelf life without the inclusion of any artificial additives such as coagulating agents, germicides and the like; wherein soybean juice is subjected to lactic acid fermentation until its pH is reached to a value equal to or less than a value which is determined from the percentage of the solids content (5–16 wt. %) of soybean juice and then is subjected to heating (60°–95° C., 10–100 minutes) to adjust the curd tension to above 20 g.

5 Claims, 1 Drawing Figure

METHOD OF MANUFACTURING A PACKAGED SOYBEAN CURD

BACKGROUND OF THE INVENTION

1. Field of the Invention

The present invention relates to a method of manufacturing a packaged soybean curd with long shelf life of at least one month at room temperature and without inclusion of any artificial additives such as coagulating agents, germicides and the like.

2. Description of the Prior Art

A soybean curd called "TOFU" has been well known in Japan for a long time. Since soybean curd contains high quality protein and is of low price, it has come to be attractive and highly regarded in many countries in the world.

In fact, in recent years, soybean curd has been utilized as one of the materials for making seasonings or prepared foods such as dressings, spreads, sauces, hors d'oeuvres, salads and the like not only in Southeast Asia but also in Western countries.

In this regard, the development of glucono-delta-lactone as a coagulating agent for soybean juice has made a considerable contribution, since glucono-delta-lactone moderately reacts with soybean juice compared to the traditionally used coagulating agents such as bittern (so called "Nigari" in Japan) and an agent called "SUMA-SHIKO" in Japan and comprised of calcium sulfate. In fact, glucono-delta-lactone makes it possible to manufacture soybean curds having uniform quality on a mass production scale, since glucono-delta-lactone can be sufficiently mixed with soybean juice prior to commencement of the coagulation reaction at low temperature. Also mass production of soybean curds in an aseptic atmosphere makes it possible to prolong shelf life of soybean curds without inclusion of any germicide.

Some of the typical prior art relating to mass production of soybean curds having long shelf life are disclosed in Japanese Patent Public Disclosures No. 50(1975)–160450, No. 51(1976)–15657 and No. 51(1976)–73159. In these references, glucono-delta-lactone is used as a coagulating agent and a divalent metal salt is used as a supplementary agent.

However, reflecting the recent trend of the public toward natural foods, it has been proposed to provide a method for producing a packaged soybean curd containing no artificial additives such as artificial coagulating agents and synthetic germicides.

One known method for producing such a soybean curd without inclusion of any artificial additives is disclosed in Japanese Patent Publication Gazette No. 53(1978)-25015 wherein a certain amount of water and oil (or fat) are added to and homogeneously mixed with soy protein isolate having a specific range of gel-formation capability and then the resulted mixture is heated to effect coagulation. In this method, however, there are some defects that the material is limited only to those soy protein isolates having a specific range of gel-formation capability. In addition it is difficult to obtain uniform quality products because the solubility of soy protein isolate deteriorates during storage. Another problem is that soy protein isolate may coagulate by heating only when it is dissolved in higher concentration, but if the concentration is increased the viscosity of the solution is increased and this makes homogeneous coagulation difficult.

Soybean cheese and soybean yogurt prepared by lactic acid fermentation of soybean juice have also been known. However, as will be described in Test 1, soybean juice does not form a curd having the texture of TOFU following lactic acid fermentation of soybean juice. As far as the inventors know, there is no prior reference which clearly states or suggests a method for producing a soybean curd by subjecting soybean juice to lactic acid fermentation and then to thermal coagulation.

SUMMARY OF THE INVENTION

Accordingly it is a general object of the present invention to provide a method of manufacturing a packaged soybean curd wherein soybean juice is coagulated without using any artificial coagulating agent.

Briefly speaking, the present invention provides a method of manufacturing a packaged soybean curd which method comprises the steps of:

1. preparing a pasteurized or sterilized soybean juice,
2. inoculating lactic acid bacteria into the pasteurized or sterilized soy bean juice and stirring them to obtain a homogeneous mixture thereof,
3. adding the resulted mixture to a container and then sealing the container,
4. subjecting the packaged mixture to fermentation until the pH of the mixture reaches to a value equal to or lower than a value which depends on the percentage by weight of the solids content of the soybean juice, and
5. heating the fermented mixture at a temperature between 60°–95° C. for 10–100 minutes to adjust the curd tension to above 20 g.

The foregoing together with other objects, features and advantages of the present invention will be more apparent after referring to the following specification and the accompanying drawing.

DETAILED DESCRIPTION OF THE PREFERRED EMBODIMENTS

Figure 1:
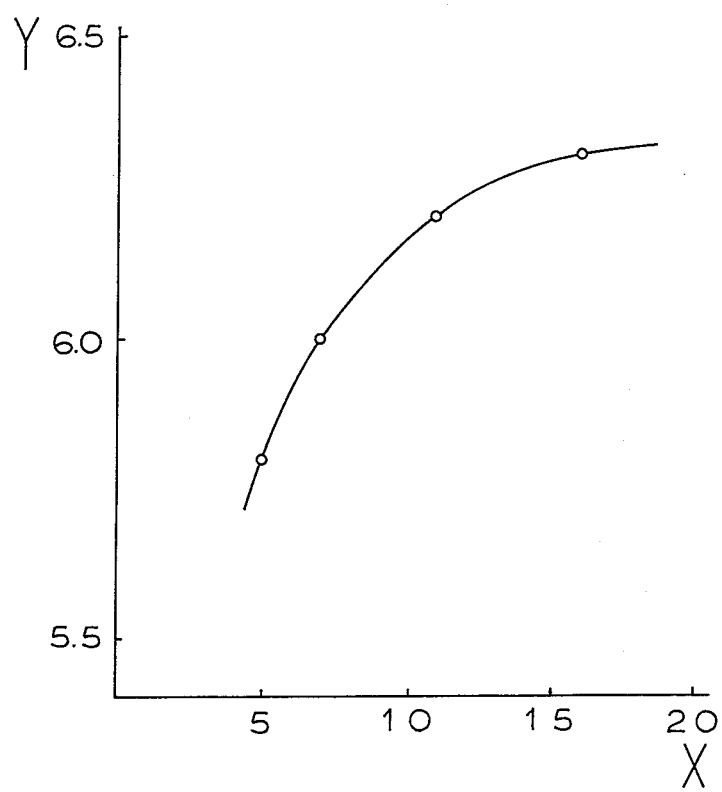
FIG. 1 is a graph showing the upper limit of the desirable pH value of the fermented soybean juice as a function of the solids content of soybean juice to be fermented.

The soybean juice used in the present invention may be prepared in accordance with the conventional method using whole soybeans or defatted soybeans as a primary raw material. Soybean juice made from commercially available powder of soybean isolate may also be utilized. The soybean juice prepared is led to a storage tank wherein the solids content of the soybean juice is adjusted to 5–16 wt. %, preferably to 7–12 wt. %. When the solids content is less than 5 wt. %, insufficient coagulation results in the finished product as will be described in Test 2, and the product having the desired texture cannot be obtained. On the other hand, when the solids content of soybean juice exceeds 16 wt. %, it is difficult to process the soybean juice due to its increased viscosity and the finished product having the desired texture cannot be obtained, since it is too hard following coagulation. If desired, natural seasonings (salt, honey etc.) and/or growth stimulating substances for lactic acid bacteria (lactose, yeast extract etc.) may be added to the soybean juice.

The soybean juice so obtained is subjected to batchwise or continuous pasteurization or sterilization. Any steam injection systems or indirect heating systems having plates which are commonly used in milk industry may be used for this purpose.

However, when the solids content of soybean juice exceeds 12 wt. %, it is advisable not to use an indirect heating system having plates, since coagulate of the soybean juice tends to adhere to the surface of the plates, and when this occurs the operation of the system may be impossible.

When a long shelf life product is desired, thermal sterilization should be performed at 128° C. for more than 1 second for completely killing spore-forming bacteria.

Thus obtained sterilized or pasteurized soybean juice is led to a tank and cooled to the optimum growth temperature (20°–48° C.) of the lactic acid bacteria to be used.

Any of lactic acid bacteria which is commonly used for producing cheese or yogurt, e.g. Lactobacillus acidophilus, L. bulgaricus, L. casei, L. helveticus, L. lactis, Streptococcus cremoris, Str. thermophilus, Leuconostoc mesenteroides, and various species belonging to genus Bifidobacterium may be used. Any single or mixed strain culture of these species may be used as a starter.

As to the culture medium for the starter, a solution prepared by dissolving 10 wt. % of skim milk powder into water or soybean juice may be used. If necessary, about 0.1–0.25 wt. % of yeast extract may be added to the culture medium as a growth stimulating substance of the bacteria. To the thus prepared culture medium, several percent of mother starter is inoculated and incubated in accordance with the conventional manner, in order to obtain a bulk starter of lactic acid bacteria.

To the previously prepared pasteurized or sterilized soybean juice, 2–5 wt. % of the bulk starter is inoculated and sufficiently stirred in the tank. After filling the so prepared mixture into containers, they are sealed. Any kind of containers made of any kinds of materials may be used as long as they have water and heat resistance and are sealable after filling the mixture thereinto. For example, a blow molded container made of synthetic resin such as polyethylene, polypropylene and the like or a container formed from a laminated sheet of three layers consisting of a layer of a thick paper coated with synthetic resin forming the exterior surface of the container and a layer of synthetic resin forming the interior surface and a layer of aluminum foil sandwiched therebetween, or a laminated sheet of four layers consisting of a plastic-coated paper layer, a plastic layer, aluminum foil layer and a plastic layer may be adequately used.

Any filling machine which is commonly used in the food industry may be utilized for filling the mixture of soybean juice and lactic acid bacteria starter. If a product having a long shelf life is desired, use of an aseptic filling machine is especially recommended. After filling the mixture in the container in an aseptic atmosphere the container is hermetically sealed and then subjected to the fermentation process.

The fermentation process is carried out by dipping the container into a water tank or by allowing the container to stand in incubation chamber which is kept at the optimum growth temperature of the lactic acid bacteria for a period until the pH of the mixture reaches a value equal to or lower than a value which is determined from the percentage by weight of the solids content of the soybean juice.

As will be described in relation to Test 2, the pH value may be determined by the following formula:

$$Y = 5.2 \times 0.071$$

[wherein, Y stands for the pH of soybean juice at the termination of fermentation, and X stands for the percentage of solids content of soybean juice within a range of 5 to 16 wt. %.]

As long as the pH of the fermented soybean juice is equal to or less than the value given by the formula, a desired final product having the texture of commercial TOFU can be obtained after subjecting it to heating process. Flavor, taste and texture of the finished product can be controled by properly selecting the pH value. When the fermentation is continued until the possible lowest pH value is achieved (usually it reaches to 3.5–4.0), a desired finished product having the texture of commercial TOFU can be obtained, but the fermentation process takes too much time and this causes undesired problems in process management such as loss of energy and time as well as higher processing cost. Therefore, the period of fermentation is desirably limited to 24 hours.

The termination of the fermentation process is decided by measuring the pH of a portion of the sample periodically with a conventional pH meter.

When the pH of the fermented soybean juice becomes equal to or less than the predetermined pH, the packaged soybean curd is dipped into a water bath and heated at 60°–95° C. for 10–100 minutes. This heating is controlled so that the curd tension of the coagulum reaches more than 20 g (inclusive), and preferably be 40–100 g. When the temperature is lower than 60° C., the desirable products cannot be obtained even when the heating period is prolonged. When the packaged soybean curd is heated at a temperature exceeding 95° C. or at 95° C. for an excessively long time, there may be a possibility of deterioration of flavor and/or taste as well as the formation of bubbles due to over-heating. Therefore, excessive heating over the above mentioned temperature is not desired. If the heating time is less than 10 minutes, a desirable finished product having the texture of commercial TOFU cannot be obtained.

The termination of the heating process is decided in such a manner that a portion of a sample is occasionally taken out and the curd tension is measured by a curd tension meter. The heating time is controlled so that a proper value of curd tension exceeding 20 g is obtained. The actual value depends upon the consistency and texture of the desired product.

After termination of the heating process, the packaged curd is left to be cooled or forced to be cooled below room temperature.

In accordance with the present invention, palatable packaged soybean curds having the desired texture can be produced on a mass production scale without adding any artificial additives such as artificial coagulating agents.

When all the steps mentioned above are performed in an aseptic atomosphere, a packaged soybean curd with a long shelf life of at least one month at room temperature can be obtained.

Having generally described the present invention, some exemplifying Tests will be described for a better understanding of the features of the present invention hereunder.

TEST 1

The purpose of this test is to exemplify the necessity of heating after the fermentation and to estimate an approximate range of the various conditions of the fermentation process (pH at the termination of fermentation) and of the heating process (temperature and heating time).

Using whole soybeans, 75 Kg of soybean juice having 10.2 wt. % of solids content was prepared in the same manner as in Example 1 described hereinafter. The soybean juice was pasteurized by heating at 80° C. for 10 minutes, and then cooled to 37° C.

On the other hand, 2 Kg of a mixture consisting of 200 g of skim milk powder, 5 g of yeast extract (by Ebios Pharmaceutical Co., Ltd.), 20 g of glucose and 1775 g of water was sterilized at 115° C. for 15 minutes in an autoclave and then cooled to obtain a culture medium. To the culture medium, 2 wt. % of a starter of Lactobacillus acidophilus (ATCC No. 4356) was inoculated under aseptic atmosphere and kept at 37° C. for 16 hours and thus 2 Kg of bulk starter was obtained. A viable bacterial count of this bulk starter was $12 \times 18^8$/ml.

To the previously prepared 75 Kg of soybean juice, 1.5 Kg of the bulk starter was inoculated and sufficiently stirred under aseptic atomosphere. Each three hundred gram of the thus obtained mixture was filled into 240 polyethylene blow molded containers each having 300 ml capacity and then these containers were heat-sealed. The sealed containers were then dipped into a water bath kept at 37° C. for fermentation.

After 2 hours from the commencement of the fermentation, 30 packages were taken out from the water bath as the samples for test group I, and 3 packages among them were rapidly cooled with chilled water (5° C.) and then kept at 20° C. in a water bath as the comparative samples which were not subjected to heat treatment. Using one package of the three comparative samples, curd tension and pH of the fermented soybean curd were measured; and flavor, taste and texture of the comparative samples were organoleptically tested using the remaining two comparative samples in the manner as described hereinafter.

The remaining 27 packages of the test group I were divided into 2 sub-groups, the first sub-group consisting of 12 packages and the second sub-group consisting 15 packages. The samples of the first sub-group were dipped into a water bath kept at 60° C. and the samples of the second sub-group were dipped into a water bath kept at 95° C. for commencing the heat treatment. At each time after 20, 40, 60 and 100 minutes from the commencement of the heat treatment, 3 packages of the first sub-group were taken out and rapidly cooled by dipping them into a water bath kept at 20° C. Likewise, at each time after 10, 20, 40, 60 and 100 minutes from the commencement of the heat treatment, 3 packages of of the second sub-group were taken out and rapidly cooled by dipping them into a water bath kept at 20° C. Using 1 package among the 3 packages which were subjected to heat treatment under different conditions, the curd tension was measured and using the remaining 2 packages among the 3 packages which were subjected to heat treatment under different conditions, the flavor, taste and texture of the samples were organoleptically tested in the manner as described hereinafter. The results are shown in Table 1.

As to the remaining 210 packages of the samples, the fermentation process was continued, and at each time after 3 hours (Group II), 4 hours (Group III), 6 hours (Group IV), 8 hours (Group V), 10 hours (Group VI), 12 hours (Group VII), and 24 hours (Group VIII) from the commencement of the fermentation process, 30 packages of the samples were taken out, and these samples of the each Groups II-VIII were tested in the same manner as conducted for the samples of Group I.

Measurement of pH of the fermented soybean juice and the curd tension of the finished products as well as evaluation of flavor, taste, and texture of the finished products were made as follows:

(1) Measurement of pH

A conventional pH meter, Zeromatic SS-3 Type by Beckman was used. Putting its electrodes directly into the respective samples which are kept at about 20° C., the pH was measured.

(2) Measurement of Curd Tension

Each sample kept at about 20° C. was taken out from the container without destroying the curd, curd tension was measured in accordance with the conventional method using a curd tension meter attached to a D type adopter by Nakamura Ika Rika. The curd tension values were measured four times per sample, and the mean value was calculated (counting as one fractions of more than 0.5 and truncating the rest at the first decimal place).

(3) Evaluation of Acceptability

Test samples of soybean curd were respectively subjected to sensory evaluation by five panels for acceptability with respect to taste, flavor and mouthfeel, on texture with respect to consistency and smoothness, and on compatibility for formulation with dressing and extensive foods. The test samples, for which the panels unanimously alleged their favorite, covering palatability, texture and compatibility were concluded as acceptable for commodity of soybean curd. The results of this test are shown in Table 1.

TABLE 1

| Group No. of Test Samples | Fermentation Condition pH value at the termination of Fermentation (Fermentation Period in hour) | Heating Period (minute) | Heating Condition Heating Temperature * 60° C. Curd Tension & Collective Judgement on Acceptability | 95° C. |
| --- | --- | --- | --- | --- |
| I | 6.2 (2 hours) | 0 | — | |
| | | 10 | | 1 |
| | | 20 | — | 2 |
| | | 40 | — | 5 |
| | | 60 | — | 7 |
| | | 100 | ± | 10 |
| II | 6.1 (3 hours) | 0 | — | |
| | | 10 | | 7 |
| | | 20 | 1 | 12 |
| | | 40 | 3 | +20 |
| | | 60 | 5 | +23 |
| | | 100 | 7 | +29 |
| III | 5.6 (4 hours) | 0 | 5 | |
| | | 10 | | +31 |
| | | 20 | +22 | +54 |
| | | 40 | +30 | +80 |
| | | 60 | +33 | +88 |
| | | 100 | +40 | +97 |
| IV | 5.3 (6 hours) | 0 | 16 | |
| | | 10 | | +42 |
| | | 20 | +24 | +63 |
| | | 40 | +33 | +83 |
| | | 60 | +35 | +94 |
| | | 100 | +44 | +99 |

TABLE 1-continued

| Group No. of Test Samples | Fermentation Condition pH value at the termination of Fermentation (Fermentation Period in hour) | Heating Period (minute) | Heating Condition | |
|---|---|---|---|---|
| | | | Heating Temperature | |
| | | | * 60° C. | 95° C. |
| | | | Curd Tension & Collective Judgement on Acceptability | |
| V | 4.9 (8 hours) | 0 | 22 | |
| | | 10 | | +48 |
| | | 20 | +27 | +68 |
| | | 40 | +36 | +84 |
| | | 60 | +39 | +96 |
| | | 100 | +42 | +103 |
| VI | 4.7 (10 hours) | 0 | 30 | |
| | | 10 | | +53 |
| | | 20 | +34 | +72 |
| | | 40 | +36 | +86 |
| | | 60 | +40 | +99 |
| | | 100 | +45 | +103 |
| VII | 4.7 (12 hours) | 0 | 32 | |
| | | 10 | | +55 |
| | | 20 | +34 | +74 |
| | | 40 | +39 | +91 |
| | | 60 | +45 | +98 |
| | | 100 | +48 | +102 |
| VIII | 4.6 (24 hours) | 0 | 53 | |
| | | 10 | | +60 |
| | | 20 | +53 | +76 |
| | | 40 | +53 | +87 |
| | | 60 | +55 | +98 |
| | | 100 | +56 | +103 |

Notes:
Curd tension is indicated in numerals at the right hand three columns (unit is gram).
* :In this column, results of this test with respect to the comparative samples which are not subjected to heat treatment in the respective groups I-VIII are indicated.
− :This indicates that the product did not form coagulum (Therefore curd tension could not be measured.)
± :This indicates that the product apparently did not form significant texture of commercial TOFU in appearance, while it exhibited slight coagulation to a comparable level with initial stage of coagulation in an acceptable product or it merely exhibited an increase in viscosity but failed to coagulate. (Curd tension was not measured for such sample.)
+ :This indicates that the product was unanimously evaluated as acceptable.

As is appreciated from Table 1, the comparative samples which were only subjected to fermentation and were not subjected to heating were not desirable products. Though the curd tension was increased in proportion to the fermentation period, elasticity of texture and mouthfeel of the products were not desirable.

Consequently, it can be concluded that a desired product cannot be obtained only by subjecting soybean juice to lactic-acid fermentation.

Also, it is apparent that the heating process may remarkably improve the quality of the samples as seen from the curd tension values and judgement of acceptability in Table 1.

More precisely, the texture of all the samples which were subjected to heating in group I was extremely soft, and a desirable product could not be obtained in group I.

On the other hand, among the samples in group II, only the samples which were subjected to heating at 95° C. for more than 40 minutes were found to be acceptable, and the curd tension of all the acceptable samples was above 20 g.

In groups III-VIII, all the samples which were subjected to heating were found to be acceptable, and curd tension of these samples was also more than 20 g.

In conclusion, it was found that a desirable product cannot be obtained when the fermented soybean juice is not subjected to heating at 60° C. and above, that when soybean juice is fermented until its pH reaches to 6.1, acceptable products can be obtained if the fermented soybean juice is subjected to heating process at 95° C. for 40 minutes or more, and that when soybean juice is fermented until its pH reaches to 5.6 or less, acceptable products can be obtained even if the fermented soybean juice is subjected to relatively moderate heating process such as 60° C. for 20 minutes.

TEST 2

The purpose of this test is to exemplify the adoptability of formula (1).

In accordance with the conventional method, two kinds of soybean juice of 7.2 wt. % and 11.3 wt. % in solids content were prepared from the soaked soybean grains by adjusting the amount of water added during the grinding process.

Adding different amounts of water to a portion of the soybean juice of 7.2 wt. % in solids content, three kinds of soybean juice of 4, 5 and 7 wt. % in solids content, were prepared.

Likewise, by diluting a portion of the soybean juice of 11.3 wt. % in solids content with water, soybean juice of 11 wt. % in solids content was prepared. On the other hand, soybean juice of 16 wt. % in solids content was prepared by concentrating a portion of soybean juice of 11.3 wt. % in solids content by a vacuum evaporator at 45° C.

These 5 kinds of soybean juice were pasteurized at 80° C. for 10 minutes and then cooled.

On the other hand, about 2 Kg of lactic acid bacteria starter was prepared in the same manner as in Test 1. Into 20 Kg of each of the previously prepared 5 kinds of soybean juice, 0.40 Kg of the starter was inoculated and sufficiently agitated in an aseptic atmosphere. Into 50 polyethylene blow molded containers each having 300 ml capacity was added 300 g of each of the inoculated 5 kinds of soybean juice were heat sealed. The containers thus 50 sample packages for each kind of soybean juice (i.e. 250 sample packages in total) were prepared and dipped into a water bath kept at 37° C. to commence fermentation. Starting with one hour after from the commencement of fermentation, the pH of the 5 kinds of samples was occasionally measured in the same manner as in Test 1. At each time when the pH of the samples having 16 wt. % in solids content reached to 6.4, 6.3, 6.2 and 6.0; the pH of the samples having 11 wt. % in solids content reached to 6.3, 6.2, 6.1 and 5.9; the pH of the samples having 7 wt. % in solids content reached to 6.1, 6.0, 5.9 and 5.7; the pH of the samples having 5 wt. % in solids content reached to 5.9, 5.8, 5.7 and 5.5; and the pH of the samples having 4 wt. % in solids content reached to 5.8, 5.7, 5.6 and 5.4, 9 packages of the respective samples were taken out from the water bath, and 4 packages among them were dipped into a water bath kept at 60° C. for 20, 40, 60 and 100 minutes and 5 packages among them were dipped into a water bath kept at 95° C. for 10, 20, 40, 60 and 100 minutes in order to subject them to heating under different conditions. Each of the samples which were subjected to heating under different conditions was immediately cooled to 20° C. and the curd tension, flavor, taste and texture of the samples were tested in the same manner as in Test 1. The results of this Test are shown in Table 2.

TABLE 2

| pH at the Termination of Fermentation | Heating Time (minutes) | Solids Content of Soybean Juice | | | | | | | | | |
|---|---|---|---|---|---|---|---|---|---|---|---|
| | | 4 wt. % | | 5 wt. % | | 7 wt. % | | 11 wt. % | | 16 wt. % | |
| | | Heating Temperature | | | | | | | | | |
| | | 60° C. | 95° C. | 60° C. | 95° C. | 60° C. | 95° C. | 60° C. | 95° C. | 60° C. | 95° C. |
| 6.4 | 10 | | | | | | | | | | 1 |
| | 20 | | | | | | | | | ± | 6 |
| | 40 | | | | | | | | | ± | 10 |
| | 60 | | | | | | | | | ± | 14 |
| | 100 | | | | | | | | | ± | 17 |
| 6.3 | 10 | | | | | | | | ± | | 6 |
| | 20 | | | | | | | | 3 | ± | 16 |
| | 40 | | | | | | | | 7 | ± | +28 |
| | 60 | | | | | | | | 10 | ± | +38 |
| | 100 | | | | | | | | 17 | 8 | +43 |
| 6.2 | 10 | | | | | | | | 2 | | 10 |
| | 20 | | | | | | | | 6 | ± | 25 |
| | 40 | | | | | | | — | 13 | 7 | +44 |
| | 60 | | | | | | | — | +20 | 10 | +56 |
| | 100 | | | | | | | ± | +24 | 14 | +65 |
| 6.1 | 10 | | | | | | — | — | 8 | | |
| | 20 | | | | | | — | ± | 16 | | |
| | 40 | | | | | | — | 4 | +23 | | |
| | 60 | | | | | | — | 9 | 2 | +31 | |
| | 100 | | | | | | — | 15 | 5 | +39 | |
| 6.0 | 10 | | | | | | | 3 | | | +41 |
| | 20 | | | | | | — | 8 | | 9 | +92 |
| | 40 | | | | | | — | 14 | | +23 | +96 |
| | 60 | | | | | | ± | +21 | | +38 | +107 |
| | 100 | | | | | | 3 | +26 | | +51 | +112 |
| 5.9 | 10 | | | | ± | | 16 | | +37 | | |
| | 20 | | | — | 4 | — | +29 | ± | +53 | | |
| | 40 | | | — | 7 | ± | +35 | 7 | +62 | | |
| | 60 | | | ± | 12 | 4 | +40 | 14 | +73 | | |
| | 100 | | | ± | 16 | 8 | +48 | +20 | +80 | | |
| 5.8 | 10 | | ± | | 13 | | | | | | |
| | 20 | — | 4 | — | 18 | | | | | | |
| | 40 | — | 5 | ± | +22 | | | | | | |
| | 60 | — | 7 | ± | +25 | | | | | | |
| | 100 | ± | 8 | 2 | +29 | | | | | | |
| 5.7 | 10 | | 6 | | 18 | | +36 | | | | |
| | 20 | — | 10 | ± | +24 | 7 | +40 | | | | |
| | 40 | — | 12 | 5 | +26 | 13 | +47 | | | | |
| | 60 | — | 10* | 8 | +30 | 18 | +53 | | | | |
| | 100 | ± | 10* | 9 | +32 | +25 | +58 | | | | |
| 5.6 | 10 | | 3 | | | | | | | | |
| | 20 | — | 8* | | | | | | | | |
| | 40 | — | 10* | | | | | | | | |
| | 60 | — | 11* | | | | | | | | |
| | 100 | ± | 14* | | | | | | | | |
| 5.5 | 10 | | | | +29 | | | | | | |
| | 20 | | | 9 | +30 | | | | | | |
| | 40 | | | 12 | +31 | | | | | | |
| | 60 | | | 15 | +31 | | | | | | |
| | 100 | | | 17 | +34 | | | | | | |
| 5.4 | 10 | | 10* | | | | | | | | |
| | 20 | — | 12* | | | | | | | | |
| | 40 | ± | 13* | | | | | | | | |
| | 60 | 1 | 15* | | | | | | | | |
| | 100 | 3 | 15* | | | | | | | | |

Notes:
Curd tension is indicated in numerals (unit is gram).
—:This indicates that the product did not form coagulum. (Therefore, curd tension could not be measured.)
±:This indicates that the product apparently did not form significant texture of TOFU on the market in appearance, while it exhibited slight coagulation to a comparable level with initial stage of coagulation in acceptable product or it merely exhibited increase in viscosity but resulted in failure of coagulation. (Curd tension was not measured for such sample.)
+:This indicates that the product was unanimously evaluated as acceptable by the panels.
*:This indicates that the product was not suitable as a commodity, due to the remarkable whey off.

As is seen from Table 2, all the finished products obtained from the soybean juice of 4 wt. % in solids content were not acceptable, because the curd tension was less than 20 g, the texture was too soft, and remarkable whey off was observed.

As to the samples having solids content from 5 wt. % to 16 wt. %, desirable products can be obtained depending upon the specific combination of conditions for the fermentation process and heating process. More specifically, when soybean juice of 5 wt. % solids content was subjected to fermentation until its pH reached 5.8 or less and then subjected to heating at 95° C. for more than 40 minutes, desirable products could be obtained and curd tension of these products was more than 20 g. Also, desirable products could be obtained when soybean juice of 7 wt. % solids content was subjected to fermentation until its pH reached 6.0 or less and then subjected to heating at 95° C. for more than 60 minutes; when soybean juice of 11 wt. % solids content was subjected to fermentation until its pH reached 6.2 or less and then subjected to heating at 60° C.–95° C. for a period until its curd tension was more than 20 g, and when soybean juice of 16 wt. % solids content was subjected to fermentation until its pH reached 6.3 or less and then subjected to heating at 60° C.–95° C. for a period until its curd tension was more than 20 g.

From these results, the relation between the solids content of soybean juice and the upper pH limit of the fermented soybean juice at which desirable products can be obtained after heating is shown in Table 3.

TABLE 3

| Solids Content of Soybean Juice (wt. %) | Upper Limit of pH at the Termination of Fermentation Process |
|---|---|
| 5 | 5.8 |
| 7 | 6.0 |
| 11 | 6.2 |
| 16 | 6.3 |

FIG. 1 is a plot of solids content (X) versus pH (Y) shown in Table 3. From this curve, an empirical formula, $Y = AX^B$ (wherein $5 \leq x \leq 16$), is adopted. The natural logarithms of both members may be shown as follows:

$$\ln Y = \ln A + B \ln X$$

whereas, lnY and lnX are in a linear relation, B and lnA (wherein $A = e^{\ln A}$) are calculated by the method of least squares based on the values in Table 3. The results are: A=5.200 and B=0.071. Substituting these values for A and B in the empirical formula, the following formula (1) was obtained.

$$Y = 5.2 \, X^{0.071} \quad (1)$$

(wherein $5 \leq X \leq 16$)

Substituting 5, 7, 11 and 16 for X in the formula (1), the corresponding values of Y are calculated. In Table 4, the resulted values of Y are compared with the values in Table 3.

TABLE 4

| Solids Content of Soybean Juice (wt. %) | pH of Fermented Soybean Juice | |
|---|---|---|
| | Values in Table 3 | Calculated Values from the Formula (1) * |
| 5 | 5.8 | 5.8 |
| 7 | 6.0 | 6.0 |
| 11 | 6.2 | 6.2 |
| 16 | 6.3 | 6.3 |

*The calculated values are round numbers counting as .1 fractions of more than .05 and cut away the rest at the second decimal place.

As is apparent from Table 4, the calculated values completely coincide with the values in Table 3. Consequently, the upper limit of the pH of fermented soybean juice in relation to the solids content within the range of 5 to 16 wt. % can be calculated from the formula (1).

TEST 3

This test exemplifies the excellent shelf life of the products in accordance with present invention compared with the packaged soybean curds presently available on the market.

The samples used in this test were as follows:

Sample No. 1: 6 packages of soybean curd prepared in the same manner as in Example 1 mentioned hereinafter in accordance with the present invention Sample No. 2: 6 packages of soybean curds by the A company purchased at a super market in Tokyo (packaged in sealed trays, including glucono-delta-lactone)

Sample No. 3: 6 packages of soybean curds by the B company purchased at a super market in Tokyo (packaged in sealed trays, including glucono-delta-lactone)

Sample No. 4: 6 packages of soybean curds prepared in accordance with the Example 1 of Japanese Patent Public Disclosure No. 51(1976)-15657 (packaged in tetra brick, including glucono-delta-lactone)

These samples were kept at room temperature (23°–27° C.), and after 3 days, 7 days and 1 month from the commencement of each preservation, two packages of the sample was taken out for quality evaluations. As to the samples purchased in the market, the preservation period was calculated from their production data indicated on their packages. The samples taken out were first checked with the unaided eye for changes in appearance, then subjected to sampling to measure viable bacterial count, and lastly subjected to sensory tests for acceptability.

The viable bacterial count was determined in accordance with the conventional method using the standard agar culture medium (by Kyokuto Seiyaku Kogyo).

The sensory test for flavor, taste and texture was made by the pair test method using the respective sample and a commercially available packaged soybean curd by the A company having the production date as fresh as possible. The unanimous judgements of 7 judges among 10 judges (consisting of 5 men and 5 women) are shown in Table 5.

TABLE 5

| Sample No. | Specification | Test items | Condition for preservation | | |
|---|---|---|---|---|---|
| | | | 3 days at room temperature | 7 days at room temperature | 1 month at room temperature |
| 1 | Products in accordance with the present invention | Viable bacterial count | 0 in two packages | 0 in two packages | 0 in two packages |
| | | Texture | good mouthfeel, smooth and fine in two packages | good mouthfeel, smooth and fine in two packages | good mouthfeel, smooth and fine in two packages |
| | | Flavor and taste | fresh taste in two packages | fresh taste in two packages | fresh taste in two packages |
| | Products | Viable bacterial | 0, 13 | 820, 20 | $83 \times 10^8$, ∞ |

TABLE 5-continued

| Sample No. | Specification | Test items | Condition for preservation | | |
|---|---|---|---|---|---|
| | | | 3 days at room temperature | 7 days at room temperature | 1 month at room temperature |
| 2 | in market by A Co. | count Texture | good mouthfeel, smooth and fine in two packages | good mouthfeel, smooth and fine in two packages | putrefied, gas swelling, not fit for food in both packages |
| | | Flavor and taste | fresh and good taste in both packages | lost bean curd flavor in one package, lost fresh taste in other package | |
| | | Viable bacterial count | 80 × 10$^8$, ∞ | | |
| 3 | Products in Market by B Co. | Texture | putrefied, gas swelling, not fit for food in both packages | | |
| | | Flavor and taste | | | |
| | | Viable bacterial count | 0 in both packages | 0 in both packages | 0 in both packages |
| 4 | Products prepared in accordance with the method of Patent Public Disclosure 51-15657 | Texture | good mouthfeel, smooth and fine in two packages | good mouthfeel, smooth and fine in two packages | good mouthfeel, smooth and fine in two packages |
| | | Flavor and taste | fresh and good taste in both packages | fresh and good taste in both packages | fresh and good taste in both packages |

Note:
(1) ∞ means that the viable bacterial count was too high to count
(2) The products by the B Co. come not to be fit for food after three days of preservation, and these samples were not preserved further.

As is seen from the Table 5, the products prepared in accordance with the present invention showed excellent shelf life, and no bacteria was detected even after 1 month preservation at room temperature as in the aseptic soybean curd of Sample No. 4, and the texture, flavor and taste were comparable thereto.

In contrast, the commercially available products of Samples No. 2 and No. 3 were apparently inferior to the products in accordance with the present invention in viable bacterial count, flavor, taste and texture after 7 days preservation.

It will thus be seen that the present invention achieves the following effects:

(1) a packaged soybean curd can be prepared on mass production scale without inclusion of any artificial additives such as artificial coagulating agent (e.g. glucono-delta-lactone) and artificial germicide.

(2) a packaged soybean curd prepared in accordance with the present invention is comparable in a variety of aspects with the features of commercial TOFU, e.g. flavor, taste and texture.

EXAMPLE 1

Ground soybean slurry was prepared by washing 720 Kg of soybean grains produced in the U.S.A., dipping them in running water for 12 hours to swell them, and then grinding them up with about 3,000 Kg of water. The obtained slurry was steamed for 4 minutes at 101° C. in a continuous cooker; most insolubles were removed by use of a pressing machine; and fine particles of insolubles were further removed by use of vibration screen to yield about 3,600 Kg of soybean juice. The soybean juice obtained contained 10.5 wt. % solids content.

Lactic acid bacteria starter was prepared by inoculating 3% of Lactobacillus acidophilus (ATCC No. 4356) into a culture medium consisting of 1,200 g of skim milk powder, 30 g of yeast extract (Trademark "Meast," by Ebios Yakuhin Kogyo), 120 g of glucose and 10,650 g of water, sterilizing at 115° C. for 15 minutes in an autoclave and then cooling and incubating for 16 hours at 37° C.

Using a UHT Sterilizer Model R-50 (by APV Co.), previously prepared 3,600 Kg of soybean juice was sterilized at 136° C. for 2 seconds and after cooling to 37° C. the sterilized soybean juice was led to an aseptic tank. Transferring 600 Kg of the sterilized soybean juice into the aseptic mixing tank, the entire previously prepared lactic acid bacteria starter was inoculated thereinto and sufficiently agitated in an aseptic atmosphere.

Using an aseptic brick filling machine Model AB-300 (by Nippon Tetra Pack), the mixture of soybean juice and starter was added to aseptic brick containers each having 300 ml capacity and sealed in an aseptic atmosphere. The container was formed in a machine from a continuous laminated sheet material consisting of layers of polyethylene, paper, polyethylene, aluminum foil and polyethylene. The filled packages were allowed to stand in an incubation chamber at a temperature which was previously adjusted at 37° C. for fermentation.

Since the upper limit of the pH of fermented soybean juice was calculated as 6.1 by substituting 10.5 (solids content of soybean juice) for X in the formula (1) (counting as 0.1 fractions of more than 0.05 and truncating the rest at the second decimal place), the fermentation process was continued until the pH of the soybean juice decreased to less than 6.1. After 4 hours from the commencement of fermentation, fermented soybean juice having pH of 5.7 was obtained and immediately thereafter the packages were dipped into a water bath kept at 90° C. for 30 minutes and then cooled. About 2,000 packaged soybean curds were obtained. The curd tension of these products was 62 g as measured in the same manner as in Test 1. Also, it was confirmed that these products maintained good flavor, taste and texture even after 1 month preservation according to a test conducted in the same manner as in Test 3.

EXAMPLE 2

About 1,000 Kg of soybean juice containing 9.1 wt. % of solids content was prepared from 180 Kg of soybean grains produced in the U.S.A. in the same manner as in Example 1.

A sterilized culture medium was prepared by mixing 3.0 Kg of skim milk powder, 75 g of yeast extract (Trademark "Meast"), 300 g of glucose and 26.625 Kg of water, dividing the mixture into two halves, and then sterilizing them at 115° C. for 15 minutes in an autoclave.

To the thus prepared culture mediums, 3% of Streptococcus thermophilus (IAM No. 1088) and Lactobacillus bulgaricus (ATCC No. 11842) were respectively inoculated, and about 15 Kg of 2 kinds of bulk starters were obtained after incubation at 37° C. for 16 hours.

After pasteurizing the previously prepared 1,000 Kg of soybean juice at 80° C. for 10 minutes and then cooling to 37° C., the full quantities of the 2 kinds of the bulk starters were inoculated thereinto and sufficiently agitated under an aseptic atmosphere.

The thus prepared mixtures were added to 300 ml capacity polyethylene containers in amounts of 300 g each, the containers were sealed in an aseptic atmosphere, and then the mixtures were subjected to fermentation at 37° C. in a water bath.

Since the upper limit of the pH of fermented soybean juice was calculated as 6.1 by substituting 9.1 (solids content of soybean juice) for X in formula (1) (counting as 0.1 fractions of more than 0.05 and truncating the rest at the second decimal place), the fermentation process was continued until the pH of the soybean juice decreased to less than 6.1. After 4 hours from the commencement of the fermentation process, fermented soybean juice having a pH of 5.6 was obtained and immediately thereafter the packages were dipped into a water bath kept at 85° C. for 50 minutes and then cooled for one hour in a water bath kept at 20° C. About 3,300 packages of soybean curds were obtained. The cured tension of the products was 53 g as measured in the same manner as in Test 1. Also, it was confirmed that the products maintained good flavor, taste and texture even after 2 weeks preservation according to the test in the same method as in Test 3.

What is claimed is:

1. A method of manufacturing a packaged soybean curd with long shelf life of at least 1 month at room temperature and withoug inclusion of any artificial coagulating agent, which comprises:
   (a) inoculating a starter of lactic acid bacteria into pasteurized or sterilized soybean juice and homogeneously mixing the bacteria and juice;
   (b) adding the mixture to a container;
   (c) sealing the container;
   (d) subjecting the mixture to fermentation in the container at the optimum temperature of the lactic acid bacteria until the pH of the mixture reaches to a value equal to or less than the value calculated by the following formula:

$$Y = 5.2 X^{0.071}$$

wherein Y represents pH of soybean juice at the the termination of fermentation, X represents the percentage of solids content of soybean juice within the range of 5% to 16% by weight
   and
   (e) heating the fermented soybean juice in the container at 60°–95° C. for 10–100 minutes to adjust the resulted curd tension of soybean curd to more than 20 grams.

2. The method of claim 1, wherein said starter is inoculated into pasteurized or sterized soybean juice in a ratio of 2% to 5% by weight.

3. The method of claim 1, wherein said starter is single or mixed strains of lactic acid bacteria selected from the group consisting of genus Streptococcus, genus Leuconostoc, genus Lactobacillus and genus Bifidobacterium.

4. The method of claim 1, wherein said curd tension is preferably from 40 grams to 100 grams.

5. A packaged soybean curd with long shelf life of at least 1 month at room temperature characterized by containing no artificial coagulating agent wherein said curd is prepared by the method which comprises:
   (a) inoculating a starter of lactic acid bacteria into pasteurized or sterilized soybean juice and homogeneously mixing the bacteria and juice,
   (b) adding the mixture to a container,
   (c) sealing the container,
   (d) subjecting the mixture to fermentation in the container at the optimum temperature of the lactic acid bacteria until the pH of the mixture reaches to a value equal to or less than the value calculated by the following formula:

$$Y = 5.2 X^{0.071}$$

wherein Y represents pH of soybean juice at the termination of fermentation, X represents the percentage of solids content of soybean juice within the range of 5% to 16% by weight,
   and
   (e) heating the fermented soybean juice the container at 60°–95° C. for 10–100 minutes to adjust the resulted curd tension of soybean curd to more than 20 grams.

* * * * *